Figure 1:
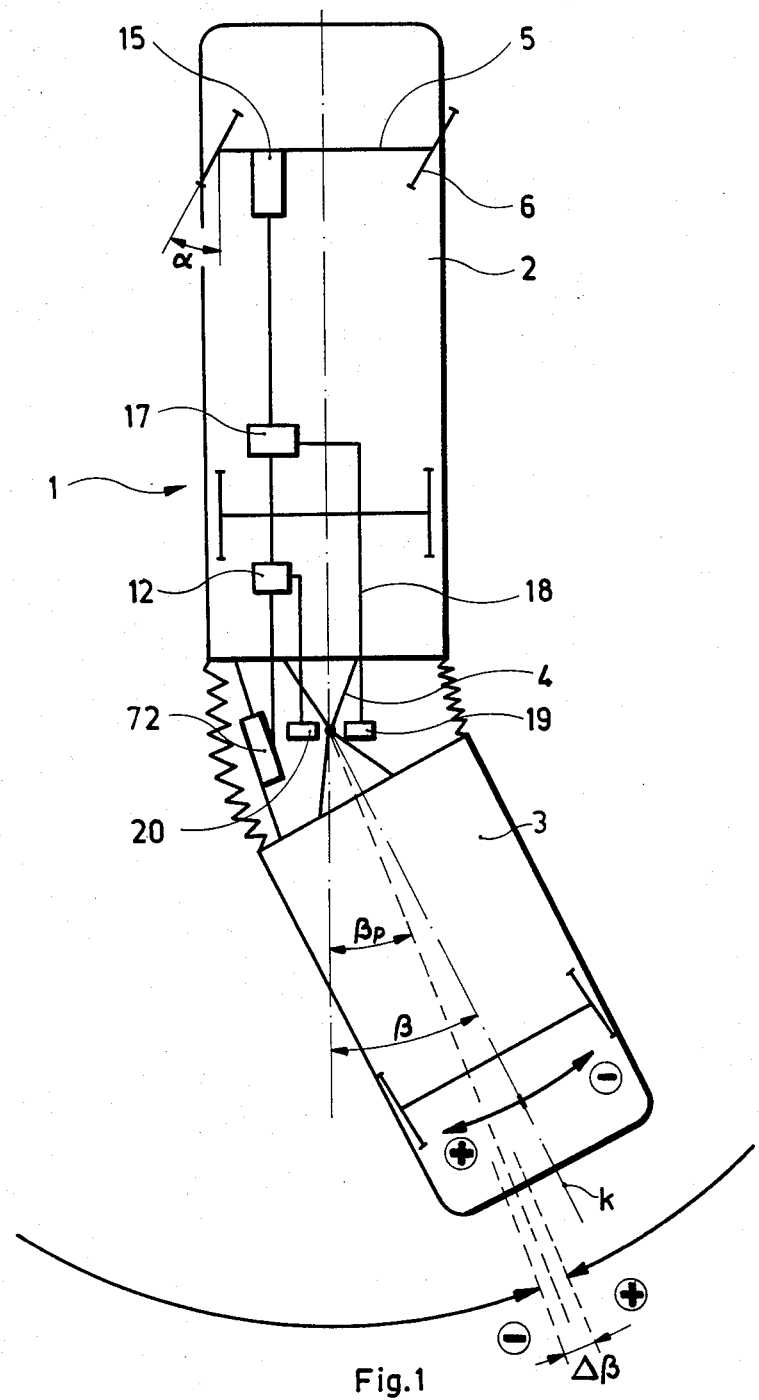

United States Patent [19]

Ratsko et al.

[11] Patent Number: 4,494,765
[45] Date of Patent: Jan. 22, 1985

[54] ANTI-JACKKNIFING DEVICE WITH FRICTION BRAKE FOR ARTICULATED MOTOR VEHICLE

[75] Inventors: István Ratsko; József Ivony; György Karászi; Jenö Mádi; Nándor Liptai, all of Budapest, Hungary

[73] Assignees: Autóipari Kutató Intézet; IKARUS Karosszéria és Jármügyár, both of Budapest, Hungary

[21] Appl. No.: 377,690

[22] Filed: May 13, 1982

[30] Foreign Application Priority Data

May 14, 1981 [HU] Hungary ................................. 1330

[51] Int. Cl.³ .............................................. B62D 53/06
[52] U.S. Cl. .................................. 280/432; 280/446 B
[58] Field of Search ..................... 280/432, 446 B, 474

[56] References Cited

U.S. PATENT DOCUMENTS 3,515,409  6/1970  Hines et al. ...................... 280/432
4,344,640  8/1982  Ratsko et al. ..................... 280/432

FOREIGN PATENT DOCUMENTS 1012530  7/1957  Fed. Rep. of Germany ...... 280/432
1142849  2/1969  United Kingdom .

Primary Examiner—Joseph F. Peters, Jr.
Assistant Examiner—D. Lynn Fugate
Attorney, Agent, or Firm—Gabriel P. Katona

[57] ABSTRACT

The invention relates to an anti-jackknifing device for an articulated motor vehicle, mainly for an articulated bus, where the torque influencing the jackknifing angle is brought about by a friction brake mechanism around the articulated coupling. The anti-jackknifing device has sensor elements sensing the run-dynamic characteristics connected to a control unit that controls the brake actuating unit of the brake mechanism. One of the elements of the friction brake mechanism braked in relation to each other is connected to one of the two or three vehicle units coupled to each other—i.e. front vehicle, trailer and intermediate vehicle unit—while the other element is connected to at least one of the further two vehicle units. One of the friction elements of the friction brake mechanism according to the invention is formed as brake rod connected to one of the vehicle units, the other friction element i.e. the brake lining is arranged in the brake bracket surrounding the brake rod and it is connected to the other vehicle unit.

In a suitable construction of the invention the cross bridge of the intermediate vehicle unit—rotatable base—arranged between the front vehicle and trailer of the jackknifing bus coupled with articulation to each other is formed by the brake rod, the brake bracket bisecting the jackknifing angle between the front vehicle and trailer is connected to the former one with a rod system.

5 Claims, 7 Drawing Figures

ANTI-JACKKNIFING DEVICE WITH FRICTION BRAKE FOR ARTICULATED MOTOR VEHICLE

The invention relates to an anti-jackknifing device with friction brake for an articulated motor vehicle, where one of the braked elements of the friction brake is connected to the front vehicle, the other one to the trailer, and it has a brake-actuating control unit which controls the brake by the influence of the selected run-dynamic characteristic of the motor vehicle.

Several devices are known for preventing the articulated motor vehicle from abnormal jackknifing, in which anti-jackknifing torque is produced by a friction brake mechanism around the articulation connecting the two vehicle units.

In the case of the device described in patent specification No. HU 173 148, a brake disc is fixed on the trailer and the surrounding brake bracket carrying the friction linings is guided in the slot of the semi-trailer tractor. The brake machanism is operated with a control unit influenced by differential pressure prevailing in the actuating spaces of the hydraulic power assisted steering gear. When the articulated vehicle travels in a straight-away, the same hydraulic pressure prevails in the actuating spaces of the power assisted steering gear, and since there is no differential pressure, the control unit does not receive an influencing signal, consequently the brake actuating cylinder is kept in constant connection with the pressure medium source by the control unit, and thus the friction brake is in the braked condition. When the vehicle travels in a straight-away the device produces an advantageous effect against lateral deviations of the trailer, but in a curve it produces reduced torque against the jackknifing angle deviation in order to follow the turn of the articulated motor vehicle, as a result of which it produces insufficient pressure in the curve against the abnormal jackknifing angle variation. Increasing torque is produced by the device in the curve only when the driver steers the front wheels toward the mid-position of the steering mechanism, i.e. when the driver corrects the arc of travel.

One advantage of the solution is that the arc segment corresponding to the brake disc of the construction regarded as a disc brake is arranged on a relatively large diameter fixed to the trailer, the brake bracket is a floating construction guided by the brake shoes in an axial direction fitting into the the cut-out of the clutch disc of the semi-trailer tractor in tangential direction, which ensures support against the braking force. The construction requires large space due to the segment forming the brake disc having a large diameter and a large arc.

Also known are brake solutions arranged around the articulation—as an axis—connecting the vehicle units, where the space requirement is less—as for instance the construction described in patent specification No. GB 1 142 849 and U.S. Pat. No. 3,515,409—here however due to the relatively small diameter, high circumferential forces arise and load the vehicle articulation.

The introduced disc-, multi-laminated disc- and drumbrake-type brake mechanisms are formed for semi-trailer tractor, where the disconnection and interconnection of the articulated motor vehicle units represent normal operations.

The invention is aimed at the realization of an anti-jackknifing device with a friction brake, in which the braking force producing the anti-jackknifing torque around the articulation of the vehicle acts along a relatively large diameter and the tie points transmitting the anti-jackknifing torque to the framework of the vehicle units are similarly arranged along a large diameter, possibly far from the centerline of the vehicle. Realization of the objective is possible the more so, since certain articulated vehicle types, e.g. articulated buses are in permanently articulated condition during their normal operation, and the vehicle units are uncoupled for repair at the expense of lengthy mounting work.

The objective in the case of the anti-jackknifing decice according to the invention was realized by forming one of the friction elements of the friction brake bringing about the anti-jackknifing torque as a brake rod fixed to one of the vehicle units by articulation, the brake rod is surrounded with a brake bracket carrying the friction linings and coupled to the other vehicle unit, a brake mechanism consisting of a brake rod and brake bracket is symmetrically arranged in relation to the longitudinal axis of the articulated vehicle and the articulated coupling ensures the arrangement of the coupling spots for each vehicle unit far from the centerline of the vehicle.

The invention relates to an anti-jackknifing device for an articulated motor vehicle, mainly for an articulated bus, where an intermediate vehicle unit is arranged between the articulated vehicle units, i.e. between the front vehicle and trailer, being in force coupling with them and connected to the force coupling mechanism suitably by bisecting the jackknifing angle, the friction brake mechanism producing torque around the articulated coupling of the vehicle is connected to the articulated vehicle units, one of the friction elements of the friction brake moving in relation to each other is formed as a brake rod connected to one of the vehicle units, the external surface of which is formed as a friction surface, the brake rod is surrounded by a brake bracket carrying the friction brake linings, and a brake actuating element is arranged in the brake bracket producing compressive force on the friction brake linings. In a suitable construction of the device according to the invention symmetrical pair of brake rods outside and parallel with the longitudinal axis of the articulated motor vehicle is in articulated coupling with the front vehicle and its brake bracket is fixed to the trailer.

The invention furthermore relates to an anti-jackknifing friction brake mechanism for an articulated three-member motor vehicle, particularly for an articulated bus, where the first and last vehicle units, i.e. the front vehicle and trailer are in jackknifing coupling with each other, the intermediate vehicle unit is coupled suitably to this articulation, said intermediate unit is a rotatable base built on a cross bridge formed as a brake rod, on which the brake bracket is connected to the front vehicle and trailer with an articulated rod forming a bisecting mechanism for the cross bridge and intermediate vehicle unit.

In a suitable construction of the device according to the invention the anti-jackknifing friction brake mechanism is hydraulically operated, the brake cylinder of which is connected through a control unit to a pressure medium source formed by a dual-action hydraulic actuating cylinder connected to the two vehicle units, and in the case of specific run-dynamic parameters sensed by the sensors of the control unit, the dual-action hydraulic actuating cylinder is interconnected with the brake cylinder through the control unit. The dual action hydraulic actuating cylinder connected to the two vehicle units offers a particularly favorable construction, since apart from forming a pressure medium source for the brake cylinder, it represents a sensor element for the control unit, because the fluid pressed out by movement of the piston produces a signal characteristic to the extent and direction of the jackknifing angle. The other sensor of the control unit is formed by an element sensing the angular deviation and steering direction of the front wheels of the front vehicle, the two sensors are connected to an evaluating, comparing unit which establishes the actual jackknifing angle deviation from the jackknifing angle ordered to the existing steering angle of the wheel, and in excess of the specified deviation value it sends an output signal to the hydraulic control unit for engagement of the dual action actuating cylinder and brake cylinder.

By fixing the hydraulic control valve on the dual action hydraulic actuating cylinder connected to the trailer, movement of the valve case in relation to the slide valve connected through the intermediate member to the unit sensing the steering angle of the wheel produces a signal characteristic of the extent and direction of the jackknifing angle, provided that the cylinder is connected to the trailer.

Figure 2:
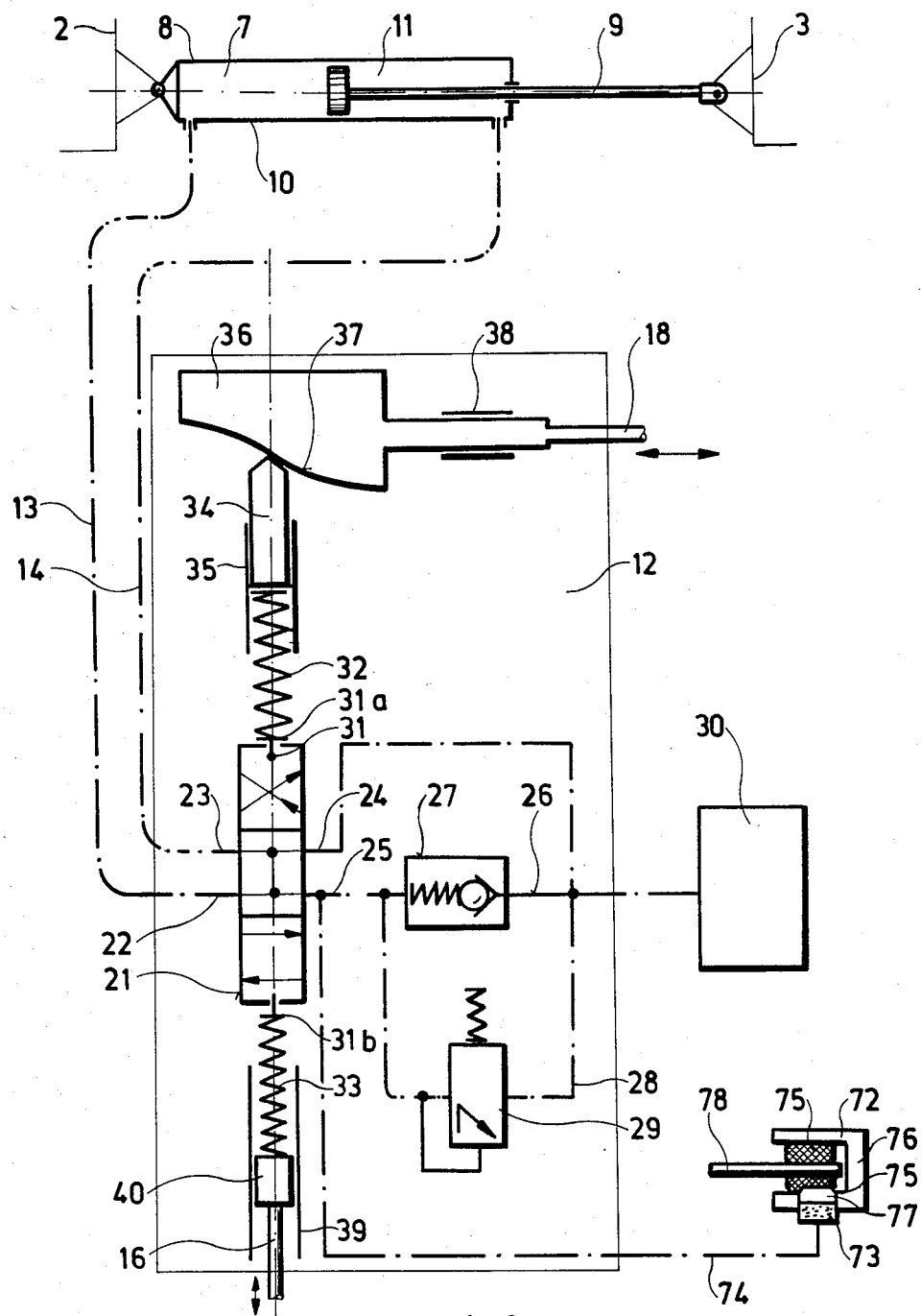
Figure 3:
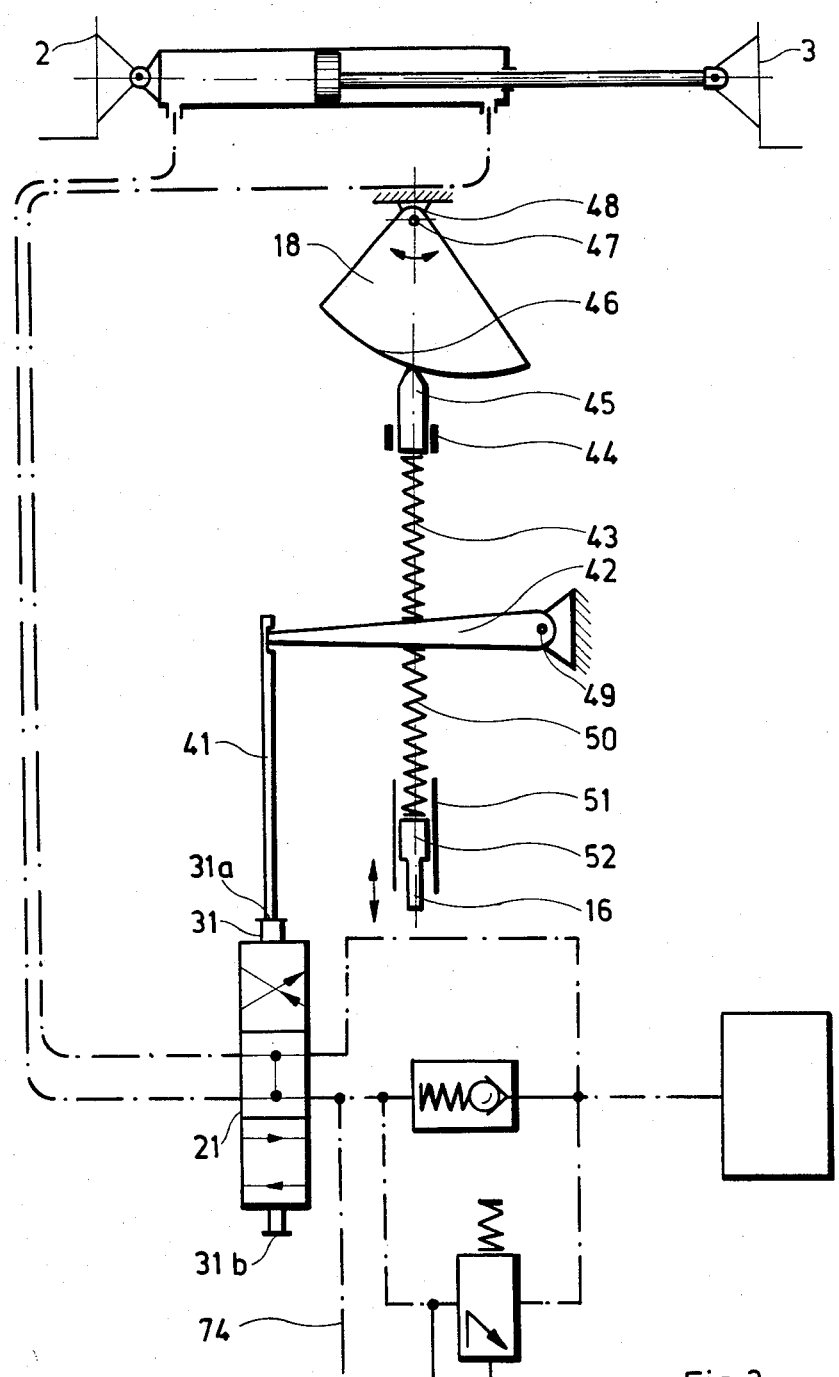
Figure 4:
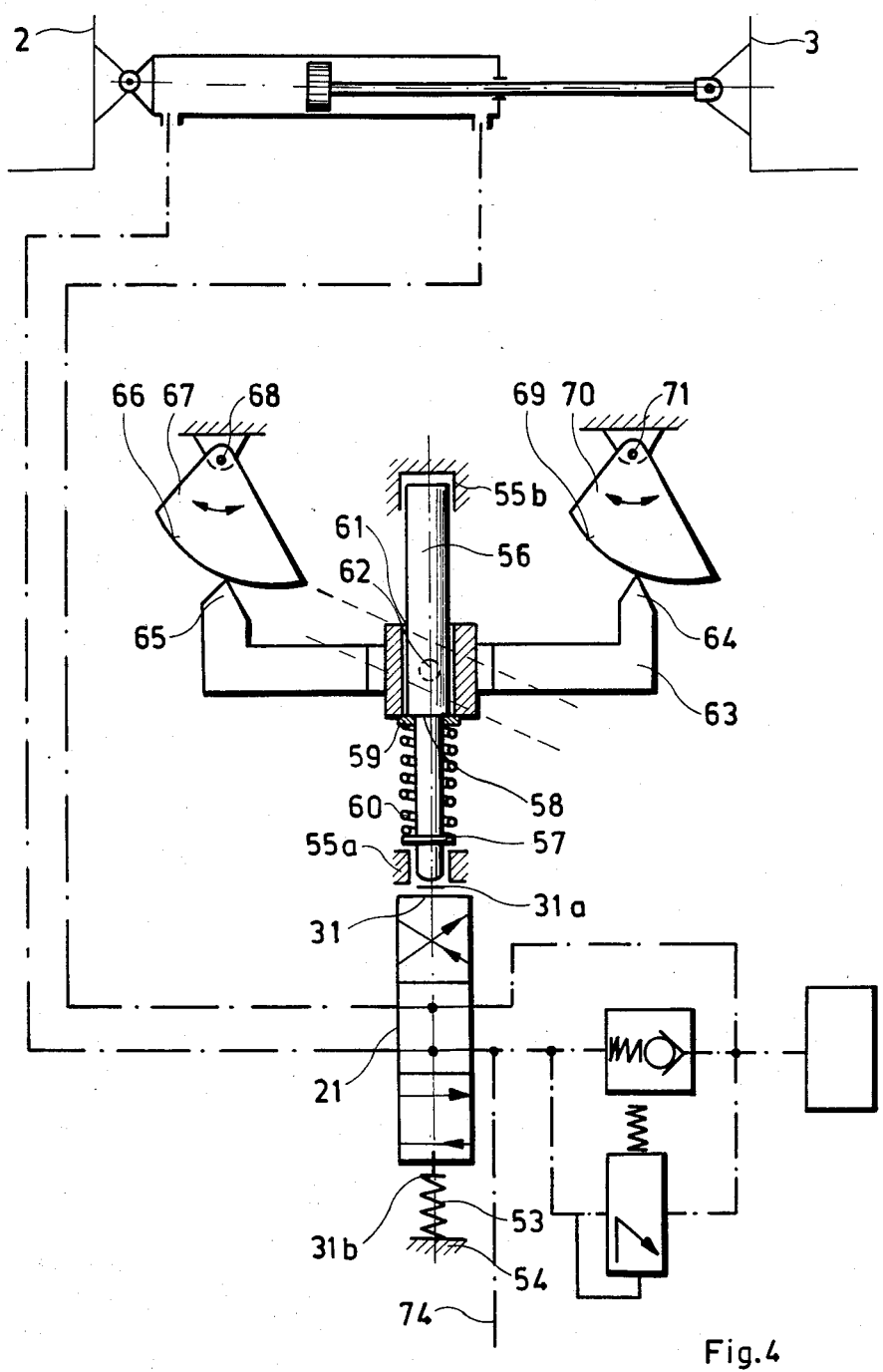
Figure 5:
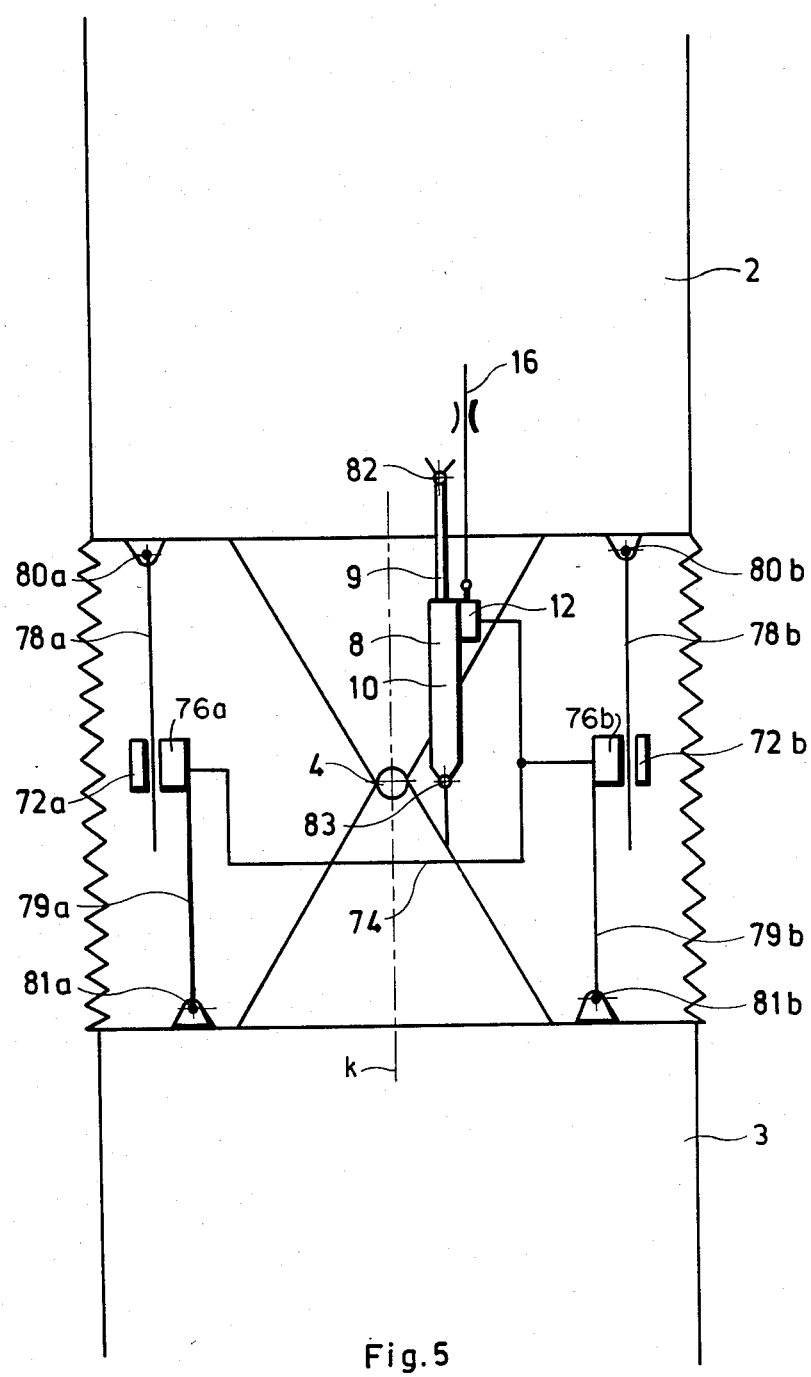
Figure 6:
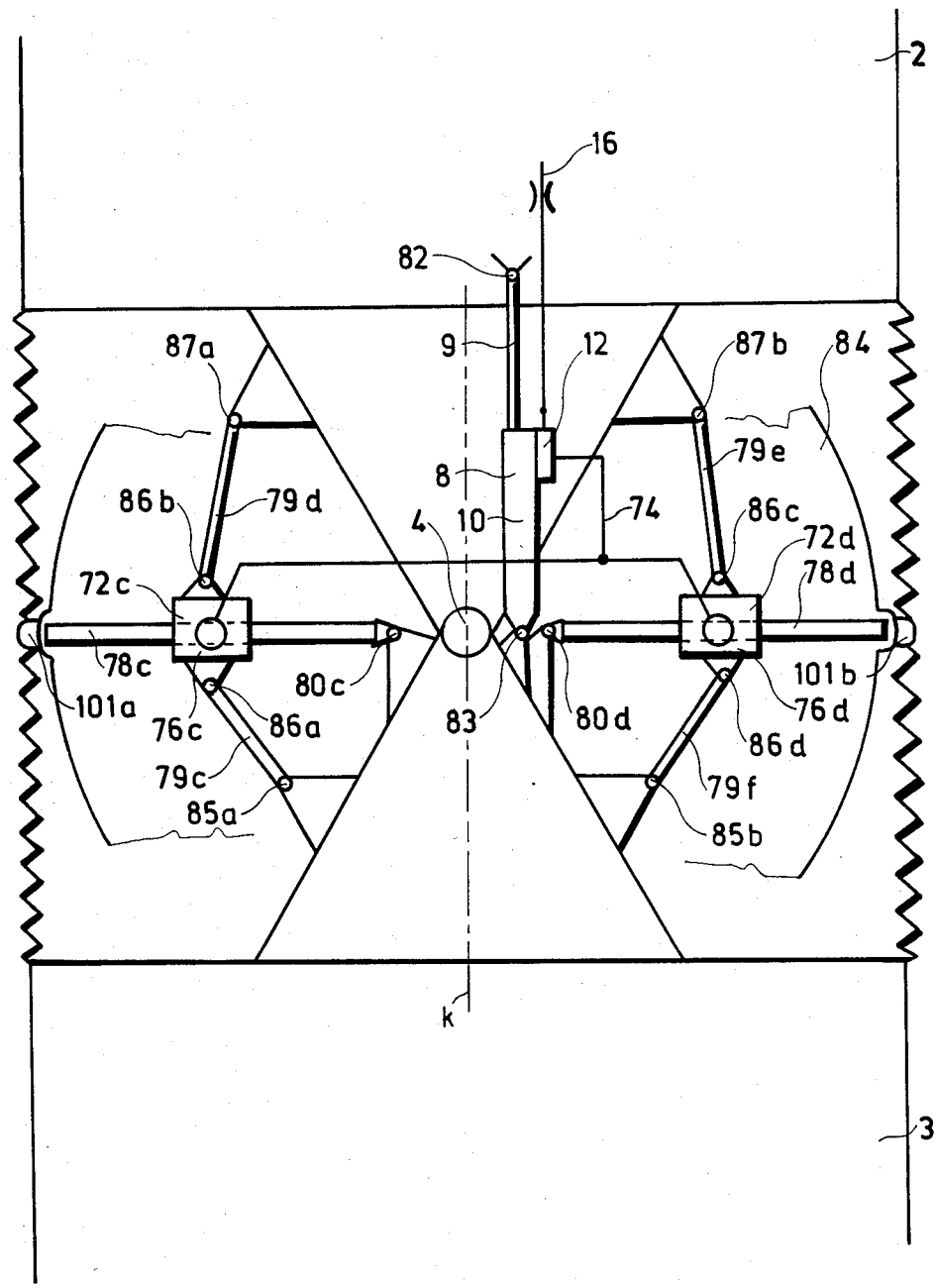

The invention is described in detail by way of examples, with the aid of FIGS. 1-7, wherein:

FIG. 1. block diagram of the anti-jackknifing device in a motor vehicle,

FIG. 2. hydraulic part and control unit,

FIG. 3. hydraulic part and control unit with rocker fitted angle position evaluator, FIG. 4. hydraulic part and control unit with two-armed lever-fitted angle position evaluator, FIG. 5. construction of the anti-jackknifing device according to the block diagram shown in FIG. 1., FIG. 6. construction of the anti-jackknifing device given by way of another example, where the brake mechanism forms a supporting and bisecting mechanism for the intermediate vehicle unit, i.e. for the rotatable base.

Figure 7:
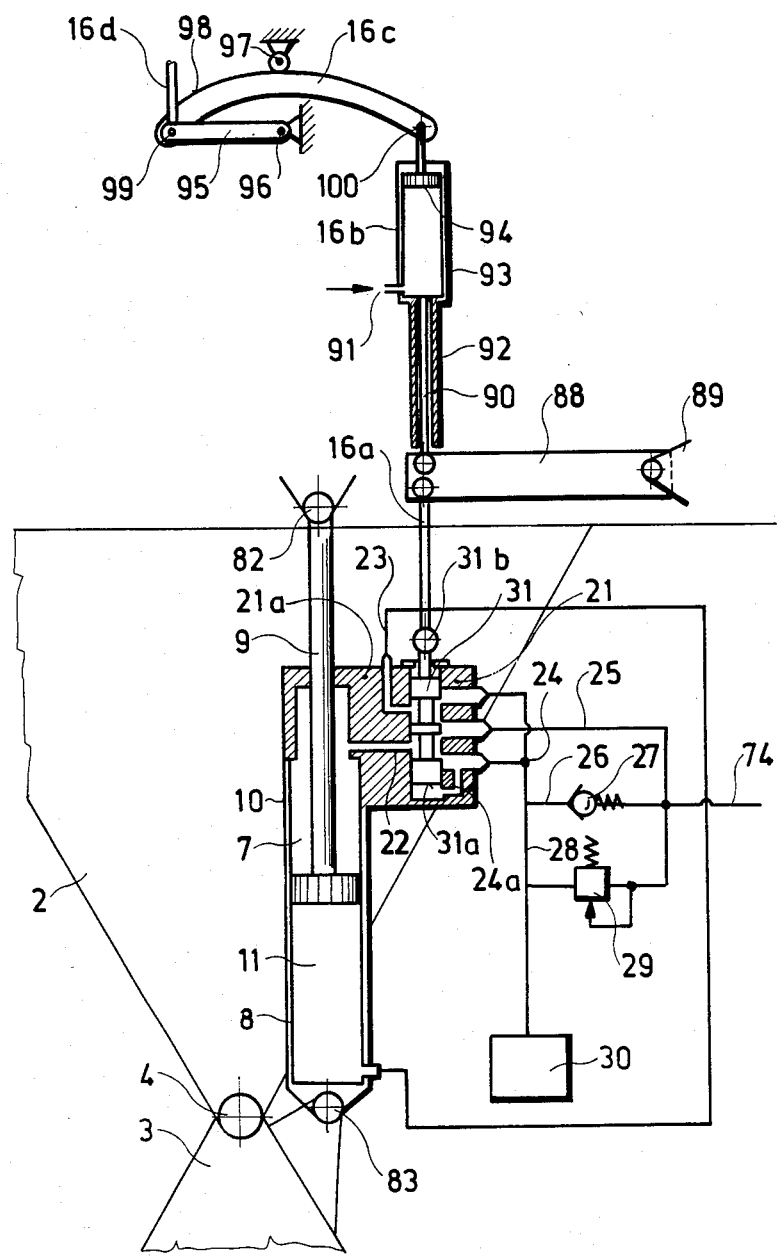

FIG. 7. hydraulic part of the device according to the second example.

The articulated vehicle 1 includes two vehicle units, front vehicle 2 and trailer 3, interconnected with articulation 4. The front axle 5 of front vehicle 2 is steered, the steering angle of the front wheels 6 is marked with $\alpha$ in the diagrams. The jackknifing angle of the front vehicle 2 and trailer 3 is marked with $\beta$.

The sensor unit 15 sensing the steering angle $\alpha$ of the wheel is fitted to the steering mechanism (not shown) of front axle 5, the jackknifing angle sensor unit 19 is built in between the front vehicle 2 and trailer 3, both are connected to the angle position evaluator unit 17, which gives the direction of deviation of the actual jackknifing angle $\beta$ from the fixed jackknifing angle $\beta_p$ corresponding to the steering angle $\alpha$ of the front wheel 6 in the form of an output signal. The jackknifing angle $\beta_p$ corresponding to the steering angle $\alpha$ of the front wheel 6 is the constant jackknifing angle $\beta_p$ developing when the steering angle $\alpha$ is kept at constant value and in case of skidproof rolling of the wheels on a flat road surface. Jackknifing sensor 20 sensing the direction of jackknifing angle $\beta$ variation is arranged between the front vehicle 2 and trailer 3 connected to the hydraulic control unit 12 together with the angle position evaluating unit 17. The control unit 12 is in functional connection with the friction brake mechanism 72, one of the mobile friction elements of which is connected to the front vehicle 2 and the other one to the trailer 3. The sensor unit sensing the steering angle of the front wheel 6 is formed as the steering indicator 15 fitting to the steering mechanism (not shown) and as the intermediating element 16 connected to the indicator. The jackknifing angle sensor unit 19 formed as the element sensing the extent and direction of the jackknifing angle $\beta$ is formed as the jackknifing angle indicator 19 built in between the front vehicle 2 and trailer 3 and as the intermediating member 18 connected to the indicator. The jackknifing angle sensor unit 20 is formed as a dual action hydraulic pistoned actuating cylinder 8, the cylinder 10 of which is fixed to the front vehicle 2 and its piston to the trailer 3. As shown in FIG. 2, the central unit of the hydraulic control unit 12 is formed by the three-position, four-way hydraulic selector valve 21 the first connection 22 of which is connected to the first actuating space 7 of the hydraulic cylinder 8 through conduit 13, and the second connection 23 is connected to the second actuating space 11 through conduit 14. The third connection 25 of the hydraulic valve 21 is interconnected with the fourth connection 24 through the conduit forming the inner hydraulic loop 26 and is provided with check valve 27 shutting off the flow from the direction of the third connection 25 towards the fourth connection 24. In the stationary intermediate position of slide valve 31 of the three-position, four-way selector valve 21 all four connections 22, 23, 24, 25 are in intercommunication, in the first control position the first 22 and third connection 25 as well as the second 23 and fourth connection 24 are in intercommunication, while in the second control position the first 22 and fourth connection 24 as well as the second 23 and third connection 25 are in intercommunication. The check valve 27 is surrounded by the parallel connected outer hydraulic loop 28, in which the pressure control valve 29 is arranged, which controls the hydraulic pressure in the conduit section between the third connection 25 and check valve 27. The hydraulic tank 30 is connected to the conduit branch between the pressure control valve 29 and fourth connection 24. The three-position, four-way selector valve 21 is actuated with electromagnets. In the example given in FIG. 2 a more complicated mechanical actuation is shown. The hydraulic valve is provided with slide valve 31, the front surface 31a of which supports spring 32 pressed on by sensor 34 resting on guide track 37 and forming the output of the jackknifing angle indicator 36 guided in conduit 35. The output of the jackknifing angle indicator 36 is formed as a guide bar guided in conduit 38 and it is in motion transmitting connection with the jackknifing angle indicator 17 through the intermediate member 18. The other face of 31b of the slide valve 31 supports spring 33 connected to the steering indicator 15 by slide valve 40 forming the output guided in conduit 39.

The length of the spring 32 is selected so as to have the path of the spring longer than the maximum movement of the sensor slide valve 34. Similarly the path of spring 33 is longer than the maximum movement of the steering indicator 40.

The hydraulic actuating cylinder 73 arranged in brake bracket 76 actuating the brake shoe 75 of friction brake 72 is connected through conduit 74 into the section of the hydraulic loop 26 between the third connection 25 and check valve 27, the piston 77 of which rests on brake shoes 75. The brake shoes 75 surround the brake rod 78. The brake bracket 76 is connected to the trailer 3, the brake rod 78 to the front vehicle 2.

In the construction shown in FIG. 3, similarly to the one described above, the equilibrium of the springs fixes the position of slide valve 31 of the three-position, four-way selector valve 21 indirectly with the aid of the lever. Slide valve 31 of the hydraulic valve 21 is connected to the push-rod 41 without play in motion transmitting connection with rocker 42 embedded in pin 49, springs 50 end 43 supported by rocker 42, and spring 43 is compressed by sensor slide valve 45 guided in slide 44 resting on guide track 46. The guide track 46 is formed on segment 47 revolving around pin 48 being in motion transmitting connection with the jackknifing angle indicator 17 through the intermediate member 18. Spring 50 is pressed to rocker arm 42 by the output of the steering indicator 52 formed as a slide valve guided in conduit 51, said rocker arm 42 is connected with the steering indicator 15 through the intermediate member 16.

In the construction shown in FIG. 4., the face 31b of slide valve 31 of the hydraulic valve 21 supports the pretensioned compression spring 53, the other end of which is seated on the fixed suppot 54. Slide valve 56 guided in bushes 55a and 55b rests on the face 31a of slide valve 31. Spring holding ring 57 is fixed to slide valve 56, supporting one end of the compression spring 60,—the pretensioned force of which is greater than the spring force arising in any position of the spring 53—while the other end presses the supporting ring 59 against the shoulder 59 of slide valve 56. In the intermediate position of slide valve 31 the guide bush 61 is over the supporting ring 59, to the cross pin 62 of which a sensor is fitted formed as two-armed lever 63.

One of the contact surfaces 65 of the two-armed lever 63 rests on the output of jackknifing angle indicator provided with guide track 66 formed as segment 67 arranged on pin 68. The rotating segment 67 is in motion transmitting connection with the jackknifing angle indicator 17 through intermediate member 18.

The other contact surface 64 of the two-armed lever 63 rests on the output of the steering angle indicator provided with guide track 69 formed as rotating segment 70 arranged on pin 71.

The outlet of the steering indicator 16 formed as a rotating segment 70 is in motion transmitting connection with the steering angle indicator 15 through the intermediate member 16.

The device functions as follows:

During continuous travel of the articulated vehicle 1, the jackknifing angle $\beta p$ of fixed value is ordered to the existing angle deviation $\alpha$ of the steered wheels 6 on the front axle 5, i.e. to the steering angle of the wheels, assuming skidproof rolling of the wheels. The steering angle of the front wheels 6 is sensed by indicator 15, the jackknifing angle by the jackknifing angle sensor 19, the output signal of both is transmitted to the angle position evaluating unit 17 through the internal construction of which the jackknifing angle $\beta p$ is ordered to each steering angle $\alpha$. The angle position evaluating unit 17 compares the two output signals and establishes the deviation of the actual jackknifing angle and the extent of deviation from the jackknifing angle $\beta p$ ordered to the steering angle $\alpha$. In case of deviation—depending on the direction—the angle position evaluating unit 17 emits two signals to the hydraulic control unit 12, which in the case of incorrect jackknifing angle variation direction coacting with the jackknifing sensor unit 20 formed as hydraulic actuating device, produces actuating pressure on the hydraulic outlet of the hydraulic control unit 12 connected to the actuating cylinder 73 of the friction brake, said hydraulic outlet actuates the brake shoes 75 and produces torque around the articulation 4 of the front vehicle 2 and trailer 3 against the jackknifing angle variation.

Operation of the hydraulic device is described in detail as follows:

In the intermediate position of slide valve 31 the selector valve 21 ensures direct hydraulic connection between the first 22 and second connection 23. The piston 9 moves freely in both directions in cylinder 10, since the connection between the first 7 and second actuating space 11 is ensured through conduits 13 and 14. In the intermediate position of the selector valve 21 extended with control play, the device has no resistance against the jackknifing process. When the selector valve 21 moves towards the end part 31b of slide valve 31, hydraulic communication is brought about between the second 23 and fourth connection 24. If meanwhile the piston rod 9 of the hydraulic cylinder 8 moves in the direction of compression, it presses the fluid out of the actuating space 7, upon which the hydraulic pressure increases, since the piston 9 forces the fluid from the third connection 25 towards the check valve 27, which shuts in this flow direction. Thus fluid flows through the hydraulic conduit 74 into the cylinder 73, the piston 77 of which compresses the brake shoes 75 supported by brake rod 78 and produces torque on the brake rod 78 against jackknifing angle variation.

As soon as the jackknifing angle $\beta p$ ordered to the steering angle $\alpha$ of the wheels coincindes with the actual jackknifing angle $\beta$ of trailer 3, the slide valve 31 returns into the intermediate position and thereby the hydraulic pressure in the brake cylinder 73 is reduced and the torque is stopped against the jackknifing angle variation.

At maximum braking force arising at maximum hydraulic pressure in the hydraulic system and thereby in the actuating brake cylinder 73, the jackknifing angle may vary in the undesirable direction too without the development of dangerous internal forces. When in the first driven position of the three-position four-way selector valve 21 the actuating piston 9 of actuating cylinder 8 moves in the direction of expansion, it forces the fluid out of the actuating space 11, and the fluid leaving the fourth connection 24 freely flows in the hydraulic loop 26 to the third connection 25, since the check valve 27 opens in this direction. The pressure develops in the hydraulic cycle necessary for opening the check valve 27, while no appreciable friction force arises in the brake 72.

The first deflected position of slide valve 31 of the three-position four-way selector valve 21 occurs when the trailer 3 is in the overdriven position in the clockwise direction in the top view of vehicle 1 from the jackknifing angle $\beta p$ ordered to the steering angle $\alpha$ of the wheel.

The slide valve 31 of the three-position four-way selector valve 21 is in the second deflected position when the trailer 3 is in the overdriven position—in the anticlockwise direction in the top view of the vehicle— from the jackknifing angle $\beta p$ ordered to the steering angle $\alpha$ of the wheel.

In this case the second connection 23 is in intercommunication with the third connection 25 and the first connection 22 with the fourth connection 24. When the piston 9 of the actuating cylinder 8 moves in the direction of expansion, it forces fluid out of the actuating space 11, and the fluid leaving the third connection 25 flows through the conduit 74 into the brake cylinder 73, the pressure increases, since the check valve 27 shuts from the direction of the third connection towards the fourth connection 24. As a result of the increased hydraulic pressure, the brake cylinder 73 produces compressive force through the brake shoes 75, whereby torque arises on the brake rod 78 against the jackknifing angle variation.

When in the second driven position of the three-position four-way selector valve 21 the piston 9 of the actuating cylinder 8 moves in the direction of compression, it forces fluid out of the actuating space 7, then leaving the fourth connection 24, it freely flows in the hydraulic cylinder 26 to the third connection 25, since the check valve 27 opens in this direction. Pressure develops in the hydraulic cycle necessary only for opening the check valve 27, and no appreciable force arises in the brake 72.

The described operation of the device is conditional on the specific installation of the actuating cylinder 8 between the front vehicle 2 and trailer 3. In the given example during clockwise jackknifing of the trailer 3—in top view of the motor vehicle 1—the piston 9 moves in the direction of compression, consequently in this case the volume of the actuating space 7 decreases.

FIG. 5 shows the construction of the brake mechanism 72 of the anti-jackknifing device by way of the first example. In case of jackknifing angle 0° of trailer 3 the brake mechanisms 72a and 72b are arranged parallel with the symmetry axis or centerline k of motor vehicle 1, on the right and left hand side, relatively far from the centerline k, the brake rods 78a and 78b are connected through articulations 80a and 80b to the front vehicle 2, brake brackets 76a and 76b are supported by rods 79a and 79b which are connected through articulations 81a and 81b to trailer 3. The brake rods 78a and 78b are surrounded by brake brackets 76a and 76b and the brake shoes (not shown) form a guide for the rectangular cross sectional brake rods 78a and 78b. Upon variation of the jackknifing angle β the brake brackets 76a and 76b slide on brake rods 78a and 78b. In case of a slight constant braking force the friction brakes 72a and 72b produce shock-absorbing torque around articulation 4. Piston 9 of the dual action hydraulic actuating cylinder 8 is connected to articulation 82 of front vehicle 2, its cylinder 10 is connected to articulation 83 formed on trailer 3, arranged relatively close to the centerline k. Control unit 12 is fixed on cylinder 10 of the dual action actuating cylinder 8 formed as a jackknifing angle indicator, said control unit 12 has a three position four-way selector valve shown in FIGS. 2-4. Axis of slide valve 31 of selector valve 21 is parallel with piston 9, the intermediate element 16 of the steering indicator 15 (not shown) is connected to the end 31b. Operation of the device is identical with that shown in FIGS. 2-4. Operation and construction of the dual action actuating cylinder 8 and hydraulic unit 12 arranged on it are described with the aid of FIG. 7.

FIG. 6 shows construction of the anti-jackknifing device by way of the second example, where the brake mechanism forms a supporting and bisecting mechanism for the intermediate vehicle unit, i.e. rotatable base. The front vehicle 2 and trailer 3 are interconnected with articulated coupling 4, forming the center of rotation for the vehicle unit formed as rotatable base 84. Articulation 80c and 80d are fixed on trailer 3 in the immediate vicinity of the vehicle articulation 4, which are connected to brake rods 78c and 78d. At jackknifing angle 0° of the motor vehicle 1, the brake rods 78c and 78d are arranged suitably perpendicularly, horizontally to the centerline k, while the intermediate vehicle unit 84 is fixed to the ends 101a and 101b opposite those connected to articulations 80c and 80d. The brake rods 78c and 78d form rectangular cross sectional guide for the brake brackets 76c and 76d of brake mechanisms 72c and 72d, in which articulations 86a, 86b, 86c, and 86d are formed. The articulation 86a is connected to rod 79c which is attached to articulation 85a on trailer 3, articulation 86b is connected to to rod 79d which is attached to articulation 87a on the front vehicle 2. Articulation 86d of brake bracket 76d is connected to rod 79f, which is attached to articulation 85b on trailer 3, articulation 86c is connected to rod 79e which is attached to articulation 87b on front vehicle 2. In the jackknifing angle position 0° of motor vehicle 1, the rods 79c, 79d, 79e and 79f are approximately at an angle of 45° to the centerline k, their length is identical, keep the brake rods 78c and 78d in the bisector of the jackknifing angles β, brake brackets 76c and 76d are sliding on them upon variation of the jackknifing angle.

Articulation 83 is formed on trailer 3 in the immediate vicinity of the articulated coupling of vehicle 4 outside the centerline k, cylinder 10 of the dual action hydraulic actuating cylinder 8 is connected to said articulation 83, the piston 9 is connected to articulation 82 arranged on the front vehicle 2. Control unit 12 is fixed on cylinder 10 of the dual action actuating cylinder 8, formed as the jackknifing angle indicator which is provided with a three-position, four-way selector valve 21 shown in FIGS. 2-4. Slide valve 31 of selector valve 21 is parallel axial with piston 9, the intermediating element 16 of the steering indicator 15 (not shown) is connected to end 31b. The brake mechanisms 72c and 72d of the anti-jackknifing device functions as a jackknifing angle braking force mechanism, when the trailer 3—regarding FIG. 6 as a top view—jackknifes clockwise in relation to front vehicle 2, then the brake bracket 76c guided by rods 79c and 79d moves on brake rod 78c towards its end, while brake bracket 76d guided by rods 79e and 79f moves on brake rod 78d towards articulation 80d. The arising friction force is transmitted by rods 79c, 79d and 79e, 79f to the front vehicle 2 and trailer 3 through articulations 85a, 85b, 87a, 87b producing torque around the vehicle coupling articulation 4 against any jackknifing angle variation. The rake mechanisms 72c and 72d are hydraulically operated, their details shown in FIG. 2 are not shown in FIG. 6. The hydraulic unit 74 is connected to the hydraulic control unit 12 with a conduit, details of the dual action actuating piston 8 and control unit 12 are shown in FIG. 7. The hydraulic connection of control unit 12 is the same as shown in FIGS. 2-4, built up from the same elements. The essence of the construction is that the cylinder 10 of the dual action actuating cylinder 8 is connected to the trailer 3, the three-position four-way selector valve 21 is fixed on cylinder 10, its slide valve 31 is interconnected through intermediating element 16 with the steering indicator 15 (not shown in FIG. 7.) sensing the steering angle of the steered front wheels of front vehicle 2, which in this example is built up from several members connected to each other. The end 31b of slide valve 31 connected with articulation to the other end of arm 16a, which is connected to a single-arm lever 88 embedded in articulation 89 on front vehicle 2, which is in articulated coupling with telescope rod 90 guided in telescope sleeve 92 of rod-member 16b. The telescope sleeve 92 forms the extension of pneumatic cylinder 93, the piston 94 is in articulated coupling with pin 100 of the single-arm lever 95 embedded in articulation 86 of the front vehicle 2. The pneumatic cylinder 93 is charged with compressed air provided with pressure medium 91 connection. Pin 100 is connected to arc segment 16c, the cam 98 is supported by roller 97. Pin 99 of arc segment 16c is connected to rod-member 16d which is in direct contact with the wheel steering indicator 15 (not shown).

The stroke of piston 94 of pneumatic cylinder 93 and the strokes of telescope rod 90 and telescope sleeve 92 are determined as to allow the expansion or compression of the intermediating element 16 at the maximum wheel steering angle $\alpha$ until the maximum irregular jackknifing angle $\beta$, without the danger of breakage over the specified force arising in the intermediating element 16 formed as multi-member rod system.

In the construction of the three-position four-way selector valve 21 according to FIG. 7 the space surrounding the end 31a of slide valve 31 is in permanent connection with the fourth connection 24 through duct 24a and the hydraulic pressure forces the slide valve 31 into the direction of the front vehicle 2. This force is counterbalanced by the pneumatic cylinder 93 of rod-member 16b. Keeping the telescope sleeve 92 and telescope rod 90 in a fully compressed state. Cam 98 of the rod member 16c is constructed in such a way, that in case of a jackknifing angle corresponding to the steering angle of the wheel, the rod movement corresponding to the existing steering angle of the wheel equals the movement of the valve case 21a at the slide valve 31, because the valve case 21a moves together with the cylinder 10.

In case of steering to the left, the rod-member 16d rotates the arc segment around the roller 97 in an anti-clockwise direction, whereby the slide valve 31 moves towards the end 31a. If no corresponding jackknifing angle variation occurs, the slide valve 31 with its end 31a butts on valve case 21a. In case of further steering to the left, the piston 94 in the pneumatic cylinder 93 moves in the direction of compression. Operation of the selector valve 21 and brake mechanism 72 have already been described.

In the second example the following elements correspond to the angle position evaluating unit 17: slide valve 31 and valve case 21a fixed on actuating cylinder 10 coupled to trailer 3 and parallel axial with members 16a, 16b, 16c, 16d. Their movement in relation to each other under the force of hydraulic pressure acting on the end 31a of slide valve 31 performs the angle position evaluation.

What we claim is:

1. In an articulated motor vehicle having an intermediate unit disposed between two vehicle units and in force coupling therewith, a force coupling bisecting the jackknifing angle and an anti-jackknifing device including a friction brake mechanism coupled to the vehicle units and producing torque around the vehicle articulation, the improvement wherein the friction brake mechanism comprises a brake rod connected to one of the vehicle units with the external surface thereof having a friction surface, a brake bracket surrounding the brake rod and carrying friction brake linings and connected to the other vehicle unit, a brake actuating element disposed in the brake bracket and applying a compressive force on the friction brake linings, wherein the mechanism comprises two brake rods articulated to one of the vehicle units symmetrically with and outside of the longitudinal axis of the motor vehicle, two brake brackets and multimember articulated rod systems on which the brake brackets are arranged and which are coupled to the vehicle units with the brake bracket supporting rod member moving in proportion with the jackknifing angle variation.

2. The device as claimed in claim 1, wherein three vehicle units are provided and the brake rod connected to one of the vehicle units is articulated in the vicinity of the vehicle coupling articulation and forms a cross bridge of the jackknifing angle bisecting coupling which is in motion transmitting connection with the intermediate vehicle unit, and the brake bracket is connected to a front vehicle and trailer through the rod system forming part of the jackknifing angle bisecting coupling.

3. The device as claimed in claim 2, wherein the brake bracket is connected to the front vehicle and trailer with an articulated rod.

4. In an articulated motor vehicle having an intermediate unit disposed between two vehicle units and in force coupling therewith, a force coupling bisecting the jackknifing angle and an anti-jackknifing device including a friction brake mechanism coupled to the vehicle units and producing torque around the vehicle articulation, the improvement wherein the friction brake mechanism comprises a brake rod connected to one of the vehicle units with the external surface thereof having a friction surface, a brake bracket surrounding the brake rod and carrying friction brake linings and connected to the other vehicle unit, a brake actuating element disposed in the brake bracket and applying a compressive force on the friction brake linings, a brake actuating control unit connected to the brake actuating element applying compressive force on the friction brake linings and influenced by a run-dynamic characteristic selected by a hydraulic conduit, wherein the run-dynamic characteristic influencing the brake actuating control unit comprises an angle position evaluating unit comprising an element sensing the steering angle of the front wheel, an element sensing the jackknifing angle, means for determining a desired jackknifing angle for each wheel steering angle, and means for producing a brake actuating output signal for any deviation of the actual jackknifing angle in excess of the desired angle, wherein the jackknifing angle sensor element comprises a hydraulic pistoned actuating cylinder with dual actuating spaces, wherein the volume of the first actuating space decreases upon clockwise jackknifing of a trailer, in the top view of the motor vehicle, a three-position, a four-way selector valve having a first connection thereof connected to first actuating space, a second connection connected to the second actuating space, a third connection of the selector valve connected to a fourth connection in a loop with a check valve to shut off the flow from the third connection towards the fourth connection, the friction brake actuating element is connected in the loop between the check valve and third connection, wherein in an intermediate position of the slide valve of the selector valve at least the first, second and fourth connections are connected, in a first deflected position of the slide valve the first and third connections as well as the second and fourth connections are connected, in a second deflected position the first and fourth connections as well as the second and third connections are connected, wherein the angle position evaluating unit is connected to the selector valve and further wherein the first deflected position of the slide valve of the selector valve is selected when the trailer is in overdriven position in clockwise direction, in the top view of the motor vehicle, the second deflected position of the slide valve of the selector valve is selected when the trailer is in overdriven position in anticlockwise direction, in the top view of the motor vehicle and the dual action hydraulic pistoned actuating cylinder acts to reduce the volume of the first actuating space with the clockwise jackknifing of the trailer.

5. The device as claimed in claim 4, wherein the piston of the hydraulic actuating cylinder with the dual actuating space formed is connected to the front vehicle, while the cylinder is connected to the trailer, the three-position, four-way selector valve is fixed to the cylinder, the slide valve is parallel to the piston rod, the sensor element sensing the steering angle of the front steered wheels of the front vehicle is connected to the slide valve and the angle position evaluating unit comprises a multi-member intermediating element, and the slide valve moving with the jackknifing angle variations.

* * * * *